United States Patent
Gerfast

(10) Patent No.: US 8,378,546 B2
(45) Date of Patent: Feb. 19, 2013

(54) GENERATOR WITH OUTPUT OPTIONS AND LOW LOSS WINDINGS

(76) Inventor: Sten R. Gerfast, Mendota Heights, MN (US)

( * ) Notice: Subject to any disclaimer, the term of this patent is extended or adjusted under 35 U.S.C. 154(b) by 243 days.

(21) Appl. No.: 10/733,944

(22) Filed: Dec. 12, 2003

(65) Prior Publication Data

US 2005/0127771 A1 Jun. 16, 2005

(51) Int. Cl.
*H02K 3/00* (2006.01)

(52) U.S. Cl. .......................................... 310/158

(58) Field of Classification Search ............... 310/68 R, 310/68 D, 158, 162, 166, 168, 171, 180, 179; 290/40 C
See application file for complete search history.

(56) References Cited

U.S. PATENT DOCUMENTS

| | | | | |
|---|---|---|---|---|
| 3,641,467 A | * | 2/1972 | Ringland et al. | 336/5 |
| 3,809,985 A | * | 5/1974 | Krause et al. | 318/490 |
| 3,961,212 A | * | 6/1976 | McAdams, Jr. | 310/68 R |
| 4,482,830 A | * | 11/1984 | Iwaki et al. | 310/113 |
| 5,041,771 A | * | 8/1991 | Min | 318/786 |
| 5,231,344 A | * | 7/1993 | Marumoto et al. | 322/14 |
| 5,406,186 A | * | 4/1995 | Fair | 318/798 |
| 5,512,809 A | * | 4/1996 | Banks et al. | 318/778 |
| 5,519,275 A | * | 5/1996 | Scott et al. | 310/112 |
| 5,975,714 A | * | 11/1999 | Vetorino et al. | 362/192 |
| 6,433,457 B1 | * | 8/2002 | Nakamura | 310/263 |
| 2004/0232796 A1 | * | 11/2004 | Weissensteiner | 310/216 |

FOREIGN PATENT DOCUMENTS

| EP | 883224 A1 | * | 12/1998 |
| JP | 6-76976 | * | 3/1994 |
| WO | WO 0113499 A1 | * | 2/2001 |

* cited by examiner

*Primary Examiner* — Tran Nguyen

(57) ABSTRACT

A more fuel efficient automotive generator, then present alternators, because of its better magnetic utilization of its series connected copper windings on its salient stator poles. It also has output options for resistive loads as well as for direct current devises with both options designed for lower cost, smaller physical size, greater electrical efficiency and lower diode losses.

18 Claims, 2 Drawing Sheets

GENERATOR WITH OUTPUT OPTIONS AND LOW LOSS WINDINGS

TECHNICAL FIELD

This invention relates to automotive generators and its windings and to the switching and usage of its electrical power generated. Switches, semi-conductors or relays are used to connect that power to lamps, actuators, window heating and electrical motors that are used in cars, busses and trucks. It also relates to a split output winding that has output options that include both AC and DC. and to how that output switching is accomplished.

DESCRIPTION OF RELATED ART

Automotive vehicles today use an alternator/generator to supply current to the lamps, relays, actuators, window heating and electrical motors that are on the vehicle. In addition the alternator/generator also have to keep the vehicles battery charged. Over the year cars have had evolutionary steps in design to get better performance and better fuel efficiency.

Cars in the past had 6-volt systems that was changed to 12-volt systems, with proposals to go to a 36/42 volt design in the near future.

The purpose of the increased voltage was to be able to decrease component size and losses in the copper wires that carries the power to the above mentioned components.

The increasing numbers of power-hungry automotive features have been straining the output of the alternator/generator and a modification of its design to increase its efficiency and also increase the vehicles fuel efficiency is very timely.

Another design change, some years ago, was to change from a DC output generator to an AC output alternator . . . that required the addition of a bank of diodes to rectify that AC output to get DC output . . . that is required to charge a battery. Even though the alternator system needed six or nine diodes mounted in a massive heat sink to function, the alternators advantage was that an alternator (plus its diodes) can charge a battery even though the car is idling, and that an alternator has a longer life carbon brush system then the carbon brush system in the older style generator. But with the change to an alternator it also made the stator winding a Y type, three phase winding, where only one of the Y windings are at the optimum power generation angle, in front of a rotor pole, at one instant. The other two phase windings, that are generally offset into adjacent stator slots, does reach that optimum angle later in time, but that deviates from the ideal: to have all three phase windings at the optimum position in front of the rotor pole at one instant, for best generation efficiency. But that is not possible with Y type windings.

Yet another change when using an alternator also came with the dis-advantage that power is dissipated in the diodes. A diode generally has a forward voltage drop of from 0.6 to 1.5 volt, with a higher voltage drop when the current is higher.

The current in the circuit multiplies this voltage drop; to equal the wattage dissipated in each diode.

This wattage is lost in heating the diode and its heat sink. In an alternator with its heavy current this loss can be substantial. This is the reason that the required diodes in today's alternator's are mounted on a metal (normally die cast) frame, to sink the heat away from the diode itself, and prevent the diode from self-destruction by its internal heating. This cooling is accomplished generally by two fan blades on the alternator, that again uses power to move the air.

In some instances the alternator cooling is done by oil or water-cooling.

As mentioned above, all the added new features in both cars and trucks is drawing power from the alternator, that lately had to be increased in size and current (amperes) to handle the extra load.

All the power that the alternator is generating and supplies to many accessories, and the power losses in diodes, heat sinking, windings, fan blades and switch devises, is provided by a belt from the engine that drives the alternator.

And of course that power, and power loss, comes from gasoline burned in the engine.

Which means decreased fuel economy.

THE PRESENT INVENTION

The object of the present invention is to get better fuel efficiency at lower cost by providing a more efficient generator with the options of DC and AC output and also having options of voltage levels. Another object is to have a more efficient power producing winding, with basically all of the copper windings in front of rotor poles at one time.

A further object of the present invention is to be able to use either "claw type" rotors with carbon-brush-slip-ring system used on many alternators sold today, or use a permanent magnet rotor that would make the generator described in the present invention totally carbon-brush-free by replacing each "claw" part with a permanent magnet pole. The P.M. rotor eliminates all slip ring components and makes the generator more reliable, simpler, smaller and less costly.

Yet another object is to decrease the size and cost of the switching components, such as relays, semi conductors and switches.

All relays have switch contacts and could therefore be called switching devises or simply "switches". Semiconductors are also basically switches, and can also be termed "switches. Relays and switch contacts are sized to operate reliably at their electrical ratings. Normal ratings for such contacts are rated in both AC and DC usage. Generally with the AC rating (when used on AC) to be double the DC rating. This means that if the generator's output had a split output; a first output that was AC and a second output that was DC, much smaller relays or switches can be used on the first AC output. And both smaller AC relays as well as smaller AC switches cost less than DC components. The diodes mentioned above would only be required on the second output which is DC and could be a four-diode bridge. The first AC output does not require any diodes.

Some of the switching in automotive applications today, is also using semiconductors operated on command from computers. Semiconductors for DC use are transistors, mosfets (Metal Oxide Semiconductor Field Effect Transistor) and I.G.B.T. (Integrated Gate Bipolar Transistor).

Semiconductors for AC use are Triac's (Three layer devise for AC) and S.C.R.'s (Silicon Controlled Rectifier).

The Triac's and S.C.R.'s are generally more robust, less expensive and having less "electro-static" problems then the mosfets, I.G.B.T.'s or transistors. Voltage regulation in alternators available today is done with mosfets or transistors that regulate voltages that goes to the battery and other components. Voltage regulation on the present invention's first output (AC) can be done with Triac's or S.C.R.'s.

The present invention has a split output with a large portion being AC output, and therefore the switching using Triac's and S.C.R.'s is accomplished with less cost and greater reliability. Electric motors that are used in the automotive field today are DC motors with carbon brushes that have a finite life before the brushes (or the whole motor) has to be replaced.

With a supply of AC power available, AC induction motors could be used in place of some of these motors. AC motors do not require any carbon brushes and is therefore more reliable.

It is also the object of this invention to use AC whenever possible.

Incandescent lamps operates equally well on both AC and DC and could be switched into the above described first output that is AC power. Window heating can be used with AC as well. Lamps such as head lamps, brake lights, back-up lamps and all the other lamps that is on an automobile, bus or truck today can easily draw 40 amperes from an 80-ampere alternator. This lamp load, if powered solely by AC power and switched by AC rated "switches", could decrease losses and therefore increase fuel efficiency.

If there is only 40 amperes "left" in the second DC output, only 40 amperes is going through the diodes and therefore has only one half the internal losses and one half the heating loss in the diodes. The 40/40-amperage example above are only used as an example; other percentages are likely.

The windings on a stator on todays alternators are 3-phase, and are wound in a "Y-configuration" and requires six or nine diodes to rectify the 3-phase output to get DC.

Without changing the alternators rotor design, the present inventions new type stator winding with the same number of stator poles as the rotor poles, could be done with alternately wound (north/south) coils, connected in series, forming a single coil with two free ends.

Each coil wound on a salient pole on the stator, is having approximately the same angular dimension, or width, as each rotor pole, with the copper winding totally surrounding each salient pole. When the rotors North/South poles are rotating in front of the North/South copper windings, power generation occurs simultaneously on all windings on all coils. This power is concentrated in the multitude of series connected coils extending into two free ends. Where it is ready to be used as AC or split into an AC connected to a first load and rectified DC connected to a second load.

The DC load could consist of charging of the battery, the small DC motors that are necessary for doors, windows and mirrors and also DC for ignition.

The present invention could also be described as an efficient generator comprising:

a rotor journalled in an generator frame, said rotor having a plurality of poles, also having a stator with a like number of poles, each including alternately wound coils coupled to form a single coil with two free ends, connected to an AC load.

This new type alternator would be more efficient because substantially all the copper coils are active in front of rotor poles and generating AC all the time, as long as the generator is running. It only requires 4 diodes in a bridge circuit to transform this AC to DC, again with power savings. If required a capacitor could be connected across the D.C. output The present invention could also be described as:

A split output generator with low loss switching devises comprising:

A generator having a first AC output connected to a first load through AC rated switches, said generator having a second output connected to a set of rectifying diodes, said rectified output connected to a second load through DC rated switches.

All the above mentioned savings of generator/alternator power, the increase in fuel efficiency, at a lower cost with greater reliability, is one of the basis of the present invention.

The illustrations of the present invention that are shown are by no means conclusive.

A person skilled in the art could easily make many different configurations with differing uses and alterations.

DETAILED DESCRIPTION OF THE INVENTION

Figure 1:
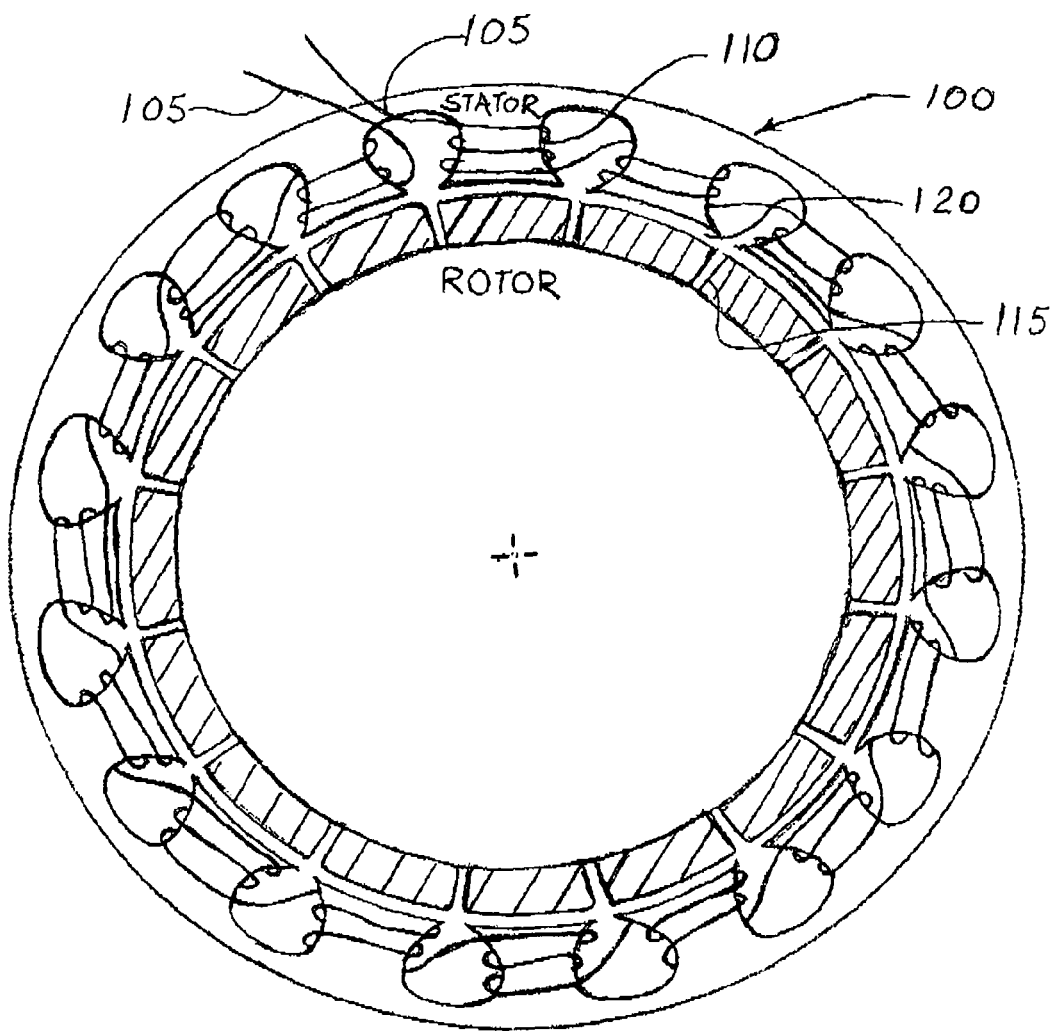
FIG. 1 is a single coil generator

FIG. 1 is a view of the wound stator 100 of the present invention showing the alternately wound magnet wire windings 105 on salient stator poles 110 that are made from lamination steel. The windings 105 are shown series connected having two free ends. The rotor poles 115 that are of the same width as the salient stator poles 110 and are made from permanent magnet material. Also shown is a small air gap 120 between the rotor face and the stator face.

Figure 2:
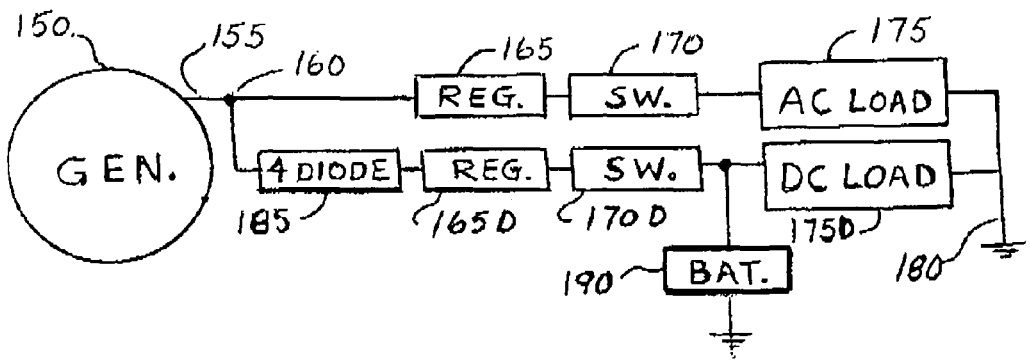
FIG. 2 is a block diagram of the single coil generator system

FIG. 2 is showing a block diagram of the generator system 10 of the present invention. It has a generator 150 with a first AC output 155 split into AC and DC at point 160, an AC voltage regulator 165 that is connected to AC rated switches 170. These switches can be manual switches, relays, semiconductor switches or computer controlled switch functions, and are connected to AC loads 175. Both AC and DC loads have common ground point 180. The split point 160 is also connected to 4 diodes in a bridge type circuit 185 with the DC connected to a DC regulator 165 D that is connected to DC rated switches 170 D. The output of these switches are connected to a DC load 175 D and a battery 190.

Figure 3:
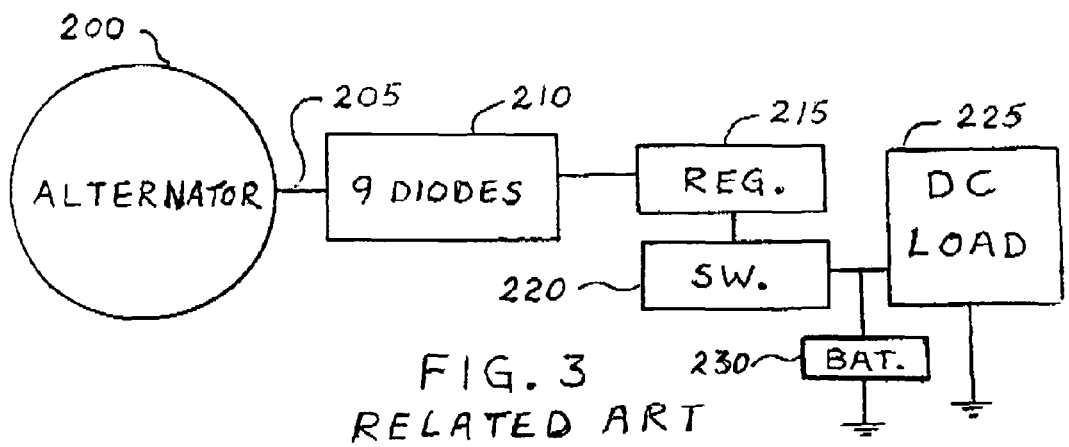
FIG. 3 is a related-art alternator

In FIG. 3 is shown a related art alternator 200 with a AC output 205 connected to nine diodes 210, connected to a DC regulator 215 that goes to switches 220. Sometimes in the related art these DC switches have been manual DC switches, or have been DC rated relays.

The switches 220 are connected to a DC load 225 and a battery 230.

Figure 4:
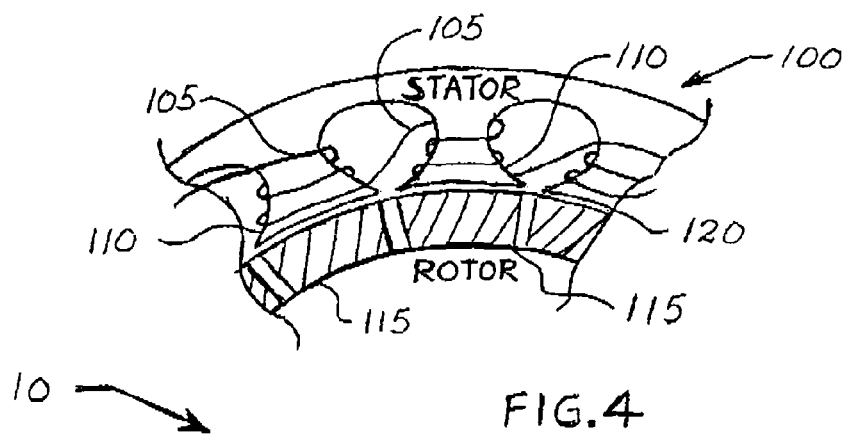
FIG. 4 is partial view of the wound stator of the single coil generator

FIG. 4 is a partial view of the wound stator 100 of the present invention showing the alternately wound magnet wire windings 105 on a pair of salient poles 110 that is made from lamination steel.

The windings 105 are shown series connected having two free ends.

The rotor poles 115 that are of same width as the salient stator poles 110 and are made from permanent magnet material.

Also shown is a small air gap 120 between the rotor face and the stator face.

The invention claimed is:
1. A single coil generator comprising:
a single coil generator having a rotor journalled in a generator frame, said rotor having a plurality of salient permanent magnet poles,
a stator with an equal number of salient stator poles,
each including alternately wound coils forming a single coil with two free stator coil ends, generating alternating current (AC)
that is connected to an AC load.
2. The generator of claim 1 wherein the output is split into AC and rectified direct current (DC).

3. The generator of claim 2 wherein the AC output is connected to a first AC load through AC rated switches and the rectified DC is connected to a second DC load through DC rated switches.

4. The generator of claim 1 wherein the output is having any combinations of low and high voltage as well as AC and DC.

5. The generator of claim 2 wherein said stator poles have same dimensional width as said rotor poles.

6. The generator of claim 1 wherein the AC is rectified by four diodes in a bridge circuit and then is connected to a DC load.

7. An output option generator with low loss switching devices comprising:
   a generator having a rotor journalled in a generator frame,
   said rotor having a plurality of salient alternate polarity permanent magnet poles,
   a stator with an equal number of salient poles,
   each including alternately wound coils forming a single coil with two free stator coil ends, generating (AC) connected to a first load through AC rated switches,
   said AC output rectified and connected to a second load through DC rated switches.

8. The generator of claim 7 wherein said first load consists of incandescent lamps, heaters and AC motors, and wherein said second load consists of DC motors, actuators and a battery.

9. The generator of claim 7 wherein said first output is voltage regulated with silicon controlled rectifiers (S.C.R's).

10. The generator of claim 7 wherein the output is split into AC and rectified DC.

11. The generator of claim 7 wherein the output is having any combination of low and high voltage as well as AC and DC.

12. The generator of claim 7 wherein said rotor is having permanent magnet poles.

13. The generator of claim 7 wherein said stator poles have same dimensional width as said rotor poles.

14. The generator of claim 7 wherein the AC is rectified by four diodes in a bridge circuit and then is connected to a DC load.

15. The generator of claim 7 wherein said four diodes are the sole diodes in the generator system.

16. The generator of claim 1 wherein said alternately wound coils are in a position in front of said rotor to generate AC at all times.

17. The generator of claim 1 wherein said generator is brushless and void of slip-rings.

18. The generator of claim 2 wherein the AC output and the DC output have a common ground.

* * * * *